United States Patent [19]
Dobler et al.

[15] 3,698,433
[45] Oct. 17, 1972

[54] FLUID-SWIVEL
[72] Inventors: Christian D. Dobler, Tustin; Herbert J. Lilly, Jr., Mission Viejo, both of Calif.
[73] Assignee: Subsea Equipment Associates Limited, Hamilton, Bermuda
[22] Filed: Sept. 11, 1969
[21] Appl. No.: 857,073

[52] U.S. Cl. ..................137/615, 285/136, 285/190
[51] Int. Cl. ..........................F16l 5/00, F16l 27/06
[58] Field of Search ......137/615; 285/136, 132, 134, 285/190

[56] References Cited

UNITED STATES PATENTS

| | | | |
|---|---|---|---|
| 2,458,343 | 1/1949 | Carleton | 285/136 |
| 2,781,134 | 2/1957 | Weir | 285/136 |
| 3,504,705 | 4/1970 | Wight | 137/615 |

FOREIGN PATENTS OR APPLICATIONS

| | | | |
|---|---|---|---|
| 759,098 | 10/1956 | Great Britain | 285/136 |

Primary Examiner—Herbert F. Ross
Assistant Examiner—William H. Wright
Attorney—L. Lee Humphries, Charles F. Dischler and Sidney Magnes

[57] ABSTRACT

The disclosed multi-line fluid-swivel comprises a drum-like structure with the various lines entering the drum, and being directed to respective apertures in the drum-wall. Each aperture has an individually-associated peripheral rotatable manifold, so that each incoming line has fluid communication with a respective manifold. Each manifold is individual; and may be installed, removed, and repaired without interference of or from the others.

6 Claims, 4 Drawing Figures

PATENTED OCT 17 1972
3,698,433
SHEET 1 OF 2
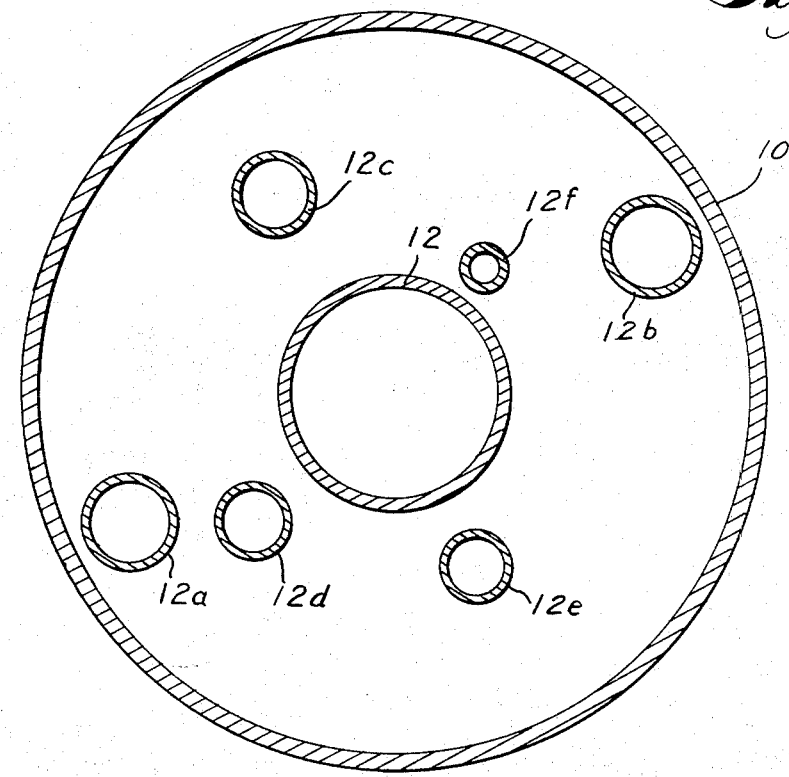
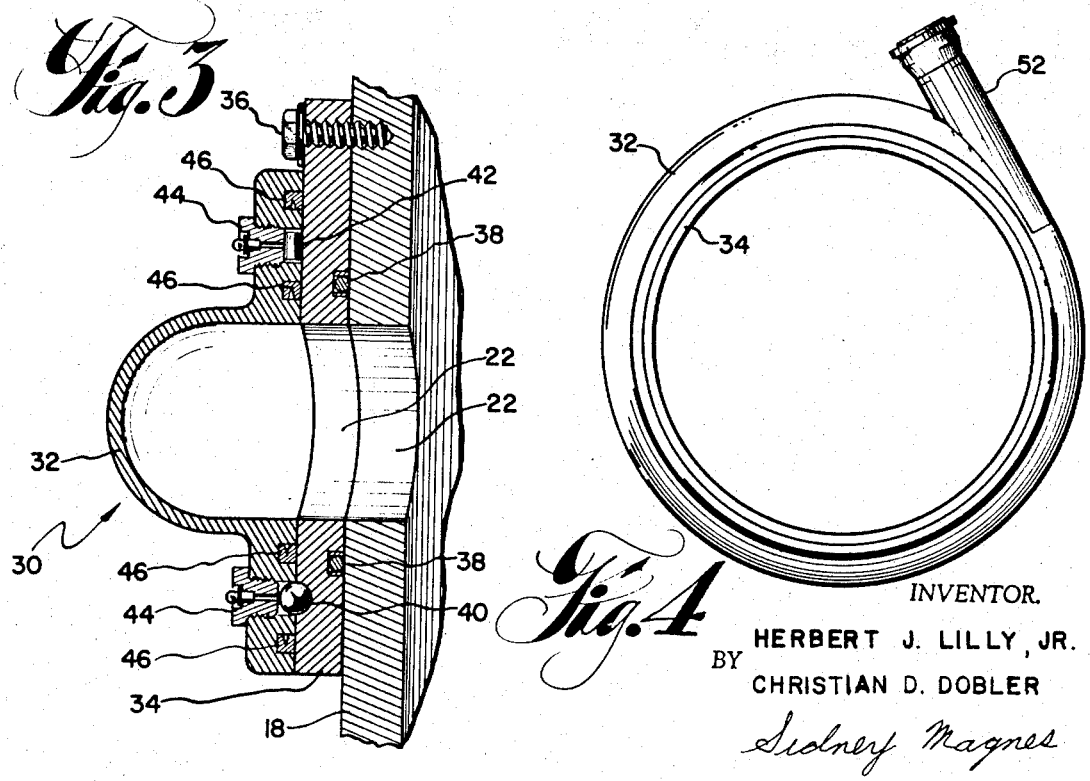
INVENTOR.
HERBERT J. LILLY, JR.
CHRISTIAN D. DOBLER
BY Sidney Magnes

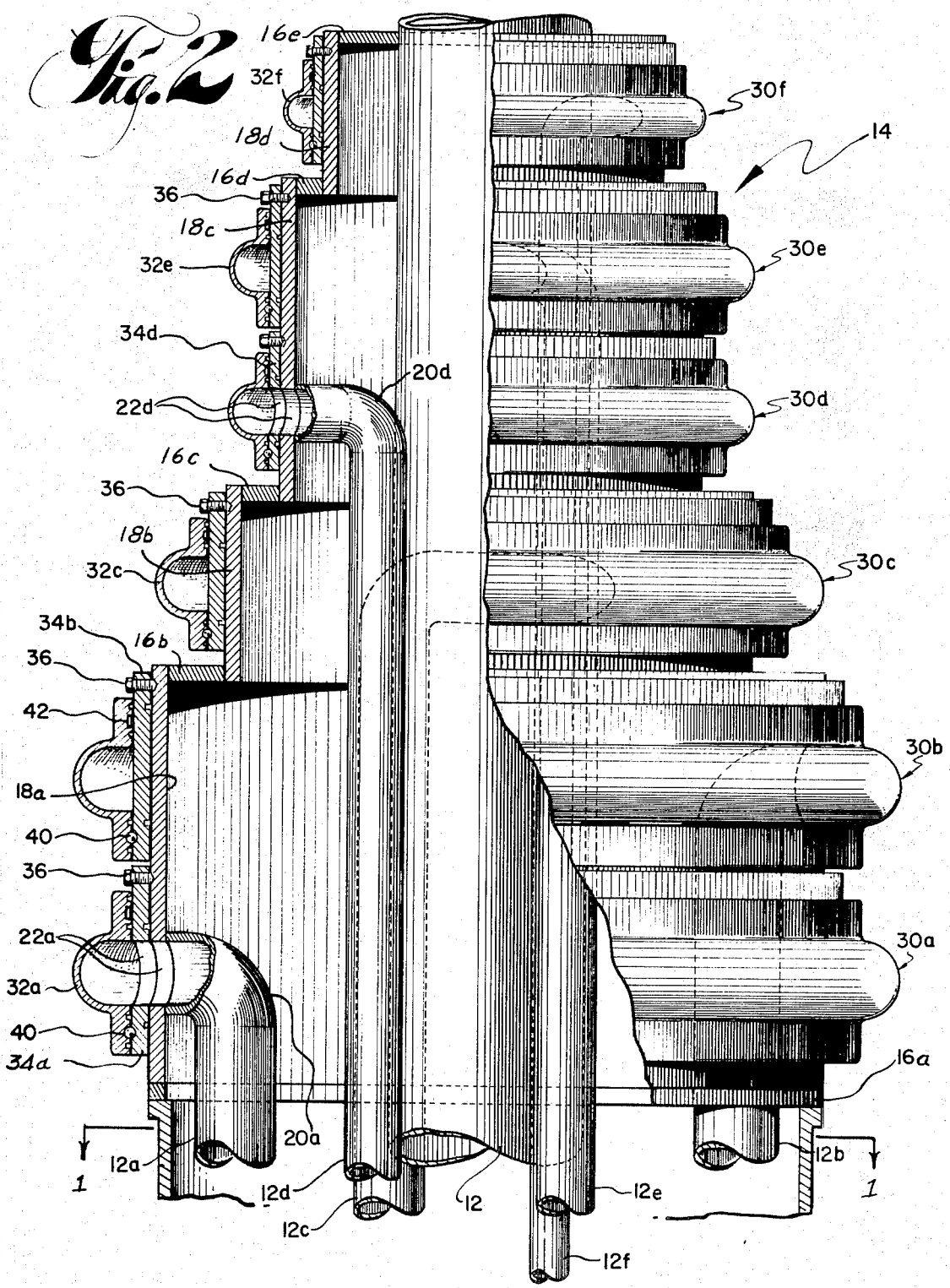

FLUID-SWIVEL

BACKGROUND

It is frequently necessary to permit the flow of fluid (gas, water, oil) from a first "line"(pipe, tubing, etc.) to a second "line"; the second line being connected in such a way that it is angled-to, and free to rotate or swivel around the first line. Such a connection is known as a "single-line fluid-swivel"; and is exemplified by the type that is used aboard a fire-fighting boat, where the water-stream must be aimed in various directions without altering the heading of the boat. Since the need for a single-line fluid-swivel arises quite frequently, there are many satisfactory single-line swivel arrangements for permitting this type of movement without restricting or hindering the flow of the fluid.

There are times however, when it becomes necessary that the fluids in a plurality of lines be swiveled in such a way that each fluid can pass without hinderance or mixing from its inlet-line to a corresponding exit-line; and such a connection is known as a "multi-line fluid swivel". While many types of multi-line fluid-swivels have been suggested, most of them have proved unsuccessful — because of excessive weight, leakage, limited-life, etc.

OBJECTS AND DRAWINGS

It is therefore an object of the present invention to provide an improved fluid-swivel; and the attainment of this object and others will be realized from the following detailed description, taken in conjunction with the drawings of which:

FIG. 1 is a representation of a plurality of lines of various sizes;

FIG. 2 is a representation of the disclosed fluid-swivel;

FIG. 3 is an illustration of a manifold for use with the disclosed fluid-swivel; and FIG. 4 shows an overall view of the manifold.

SYNOPSIS

This invention relates to a multi-line fluid-swivel wherein the incoming lines are not necessarily symmetrically positioned or concentric. The manifolds comprise a cylindrical-band on whose outer surface is a rotatable U-shaped torus, these being matched in the manner of ball-bearing raceways. Thus, the individual manifolds are independent of each other; and can be installed and/or removed without interfering with each other.

While fluid-swivels are used in many fields, the present explanation will be presented in terms of a multi-line fluid-swivel that is designed to obtain oil from oil fields at the bottom of the ocean; although it should be realized that the disclosed teachings are not necessarily limited to such usage.

In the disclosed arrangement, a "riser" (a large-diameter pipe rising from the bottom of the ocean to a surface vessel or a float) preferably encloses a plurality of pipes or lines that extend between apparatus on the floor of the ocean and apparatus on the surface. At, or near the ocean-surface, a fluid-swivel is necessary in order to provide continuous flow of the fluids — regardless of the direction of, or movement of, the vessel in response to tides, storms, winds, waves, and the like.

FIG. 1 shows an outer riser-pipe 10 that contains a plurality of lines 12, 12a, 12b, 12c, etc.; these various inner lines having their own individual sizes, and carrying their own particular types of fluids — some of the lines carrying high-pressure gasses downwardly; and others carrying low-pressure fluids upwardly, etc. The various support structures for positioning the lines within the riser have been omitted for clarity; and it will be realized that the overall riser/line arrangement produces a multi-line arrangement that requires a multi-line fluid-swivel.

FIG. 2 is an overall view of the subject fluid-swivel, and shows that fluid-swivel 14 comprises a first base-plate 16a that is suitably apertured to accept the various lines, as will be explained later. To base-plate 16a is attached, as by welding, a cylindrical-wall 18a — which may be a portion of a suitable-diameter pipe; and to the other end of cylindrical wall 18a is fastened a second base-plate 16b that is also suitably apertured in a manner to be described later. Thus the two base-plates 16a and 16b and the cylindrical wall 18a form a first drum-like container.

Referring momentarily to FIG. 1, this shows an axial pipe 12; and FIG. 2 shows that primary-line 12 passes directly through swivel 14 by means of apertures in the base-plates. Thus, it may be connected at its exit-end by means of a prior-art single-line fluid-swivel as previously discussed. Line 12 is handled in this straight-through manner in order that a "pig" (which is essentially a rubber ball having substantially the same diameter as line 12 may be readily pulled or pushed through line 12 in order to dislodge any debris that clings to the inner surface of line 12; and thus permits line 12 to be cleaned periodically. In one case, primary pipe-line 12 is used for conducting the flow of crude oils; and was designed to have an inner diameter of 12 inches, and a wall-thickness of about half-an-inch.

Attention is again momentarily directed back to FIG. 1, wherein a secondary pipe-line 12a is shown; this being, for example, a 6 inch-diameter pipe with a wall thickness of about 0.9 inches — which may be used, for instance, for carrying water in either direction.

Referring again to FIG. 2, it will be seen that pipe-line 12a passes through a respective suitably-sized aperture in base-plate 16a, into the drum-portion. Line 12a has an elbow-section 20a; and is fastened, as by welding, to an apertured-portion of cylindrical-wall 18a. Thus, fluid flowing through pipe-line 12a emerges from the fixedly-positioned pipe, enters the fluid-swivel 14 at an individual aperture of base-plate 16a, and flows through elbow 20a and opening 22a in cylindrical-wall 18a — from where it can flow into, and fill, a peripheral manifold 30a that will be discussed later.

In order to provide the desired swivel-action, the drum-configuration of FIG. 2 is held relatively immobile — as by welding the various lines to the apertured base-plate; and the manifold 30a, as will be explained later, is permitted to rotate or "swivel" around the drum.

The swiveling action will be understood from FIG. 3. Here the previously-discussed cylindrical-wall now item 18, as a narrower external cylindrical-band 34, which has — in turn — a pneumatic-tire-like U-shaped-cross-sectioned torus 32; torus 32 and cylindrical-band 34 forming a manifold 30 which is a model for the previously-discussed manifold 30a. Torus 32 and the cylindrical-band 34 are "matched" in the same way that the raceways of a ball-bearing are paired-up — so that the cylindrical-band 34 acts as the inner raceway, and torus 32 acts as the outer raceway. This will be more fully discussed later.

In assembling the manifold, a suitably-sized cylindrical-band 34 is slipped onto cylindrical wall 18, and held in position by means such as one or more locking-bolts 36. A plurality of seals, 0-rings, or the like, 38 are positioned between cylindrical-band 34 and cylindrical-sleeve 18 in order to provide a "static" seal — this to be discussed later.

Torus 32 of FIG. 3 fits onto its mating cylindrical-band 34; and is held in place longitudinally by a plurality of ball-bearings 40 and/or roller-bearings 42 that roll along suitable peripheral grooves or surfaces of cylindrical-band 34. It has been found advantageous to use a combination of ball-bearings and roller-bearings — as in this case the ball-bearings position torus 32 onto its mating cylindrical-band 34, and the roller-bearings allow the torus to expand and contract due to pressure and temperature changes; thus permitting freer rotational movement and less binding than the use of ball-bearings along. Suitable pressure and lubricating fittings 44 may be used if desired.

Since torus 32 in an annular type of structure, it completely encircles its mating cylindrical-band 34; and thus also encircles the cylindrical-sleeve 18. Due to the roller/ball arrangement and the matched-raceway arrangement, torus 32 can rotate peripherally around its mating cylindrical-band 34, and thus around the cylindrical-wall 18; suitable dynamic seals 46 (to be discussed later) being used as indicated.

Referring back to FIG. 2, it will be recalled that at elbow 20a, a portion of the cylindrical-sleeve 18a, and an aligned portion of the cylindrical-band 34a are pierced by an aperture 22a that permits fluid communication between pipe-line 12a and the interior of torus 32a — which has such a dimension that its cross-section is substantially the same as that of pipe-line 12a. As a result, fluid may flow through orifice 22a between pipe-line 12b and the interior of torus 32a. Thus, the volume within torus 32a is always filled with the same fluid as is present in pipe 12a; and torus 32a thus acts in the manner of a fluid-manifold.

In order to permit the flow of fluid into and out of manifold 30, the torus takes the overall form shown in plan-view in FIG. 4. Here the torus is shown to have an annular configuration as previously discussed, and a tangential exit-pipe 52.

Thus, referring back to FIG. 2, the fluid in pipe 12a flows through orifice 22a into the manifold; completely fills the manifold, and exits at exit pipe 52 similar to exit pipe. Since torus 32a may rotate peripherally, it is apparent that its exit-pipe may swivel around the fluid-swivel 14; providing continuous fluid-flow for any position, or change of position.

In use, a fluid — often under high pressure — will fill the volume from its inlet-pipe to its respective torus; and, in view of the rotatable torus, it becomes necessary to avoid leakage. FIG. 3 shows one way in which this can be achieved.

Since cylindrical-band 34 does not move relative to cylindrical-sleeve 18 (due to the action of locking-bolts 36) so-called "static seals" 38 prevent leakage. However, since torus 32 moves continuously relative to cylindrical-band 34, so-called dynamic-seals 46 are used to prevent leakage.

Since multiple-line fluid-swivelling action is desired, FIG. 2 shows that another pipe-line 12d — similar to the previously-described pipe-line 12a — is handled in substantially the same manner as previously described, i.e., it has its own individual rotating manifold 30d. The difference, in this case, is that orifice 22d is at an individually convenient portion of fluid-swivel 14; and longitudinally-spaced from aperture 22a and others.

It is sometimes convenient to place two manifolds, such as 30a and 30b, on the same drum-type structure; using individual cylindrical-bands, and holding these bands in place with one or more locking-bolts 36. Thus, a multiple-line fluid-swivel is obtained.

Referring back to FIG. 1, it will be seen that the riser contains an additional plurality of pipe-lines — 12b, etc., which may have various sizes; and FIG. 2 indicates that these are connected to other drum-structures, and to respective apertures and manifolds in the manner previously described — the drum-structures having, if desired, common bases. Thus, each individual pipe in riser 10 is connected to an exit pipe of its respective rotatable manifold; and — since — each individual manifold is individually mounted on its own bearings, each can therefore rotate independently of all the others, should this be desirable. The arrangement of the pipes in riser 10 is not critical, nor must they be concentrically positioned.

It will be noted that the various drum-structures and apertured bases form a unitary arrangement that is rotatable relative to the various manifolds.

In the oceanographic use discussed previously, riser 10 and its enclosed pipes are firmly attached to apparatus located at the bottom of the ocean; so that these pipes should not rotate appreciably, due to the danger of being twisted off. Therefore, the various cylindrical walls and drum-sections of fluid-swivel 14 shown in FIG. 2 are conveniently welded together at their abutments to provide a substantially firm mounting, so that the individual manifolds can rotate individually, or as a group, around the body of the fluid-swivel.

Alternatively, the manifolds may be fixedly-positioned at individual orientations, while the drum-structures rotates as a unit. It should be noted that since there is no fluid in the drum, the base-plate welds do not have to be leakproof.

After a considerable period of use, the various seals and/or bearings may have to be replaced; and these repairs are accomplished as follows. Referring back to FIG. 2 it is seen that manifold 30a (comprising torus 32a and cylindrical-band 34a) can be unbolted, and slid downwardly to become disengaged from the cylindrical-wall 18a. At that time any necessary repairs may be performed; and the assembly slipped back, and bolted into position. Similarly, manifold 30b may be removed by unbolting, and sliding it up; the clearance between cylindrical-band 34b and manifold 30c being large enough to clear manifold 30c. In a similar manner, any manifold can be unbolted and removed, without having to dismantle the rest of the fluid-swivel. This arrangement permits easy maintenance and repair, as these become necessary.

What is claimed is:
1. A multi-line fluid-swivel comprising:
A. a drum-structure having a wall and a suitably-apertured base;
B. means for bringing said lines through respective apertures of said base into said drum;
C. means for bringing the portion of said lines in said drum to individual longitudinally-spaced respective apertures of said wall;
D. individual annular manifold means, rotatable with respect to said drum-structure and positioned peripherally on said drum-structure, for mating with respective wall apertures;
 1. said manifold means comprising:
  a. a raceway fixedly-positioned with respect to said wall;
  b. a torus rotatably mounted on said raceway;
  c. said torus and raceway being matched;
E. means for affixing said raceway to said wall.

2. A multi-line fluid-swivel for a plurality of not-necessarily symmetrical arrangement of incoming fluid-carrying lines, comprising:
A. at least one drum-structure having a wall and a suitably-apertured base;
B. means for bringing said lines through respective apertures of said base into said drum;
C. means for bringing said lines to individual longitudinally-spaced respective apertures of said wall;
D. individual annular manifold means, rotatable with respect to said drum-structure, and positioned peripherally on the wall of said drum-structure, for mating with respective wall-apertures;
 1. said manifold means comprising:
  a. a raceway fixedly-positioned with respect to said wall;
  b. a U-shaped torus mounted on said raceway for peripheral rotation around said drum;
  c. means, positioned between said torus and raceway, for reducing friction therebetween;
  e. at least one static-seal positioned between said raceway and said wall.

3. A multi-line swivel comprising:
A. a first drum-structure having a cylindrical wall, a first suitably-apertured base-plate and a second suitably-apertured base-plate;
B. a second drum-structure having a cylindrical wall, a first suitably-apertured base plate, and a second suitably-apertured base-plate;
C. means for bringing said lines through respective apertures of said first base-plate into said first drum;
D. means for bringing selected ones of said lines to individual longitudinally-spaced respective apertures in said wall of said first drum;
E. means for bringing other selected lines from said first drum, through respective apertures of said second base-plate of said first drum and through respective apertures of said first base-plate of said second drum into said second drum;
F. means for bringing given ones of said other selected lines to individual longitudinally-spaced respective apertures in said wall of said second drum;
G. a plurality of individual annular manifold means, rotatable with respect to said drum-structures, and positioned peripherally on the external surfaces of said drum-structure walls, for mating with respective said wall-apertures;
 1. each said manifold means comprising:
  a. an inner raceway suitably-sized and fixedly-positioned with respect to a wall of a respective drum;
  b. a U-shaped torus-like outer raceway rotatably mounted on said inner raceway;
  c. said inner and outer raceway being matched for relative rotation;
  d. means, positioned between said matched raceways, for reducing friction therebetween;
  e. a plurality of static-seals positioned between said inner raceway and said respective wall;
  f. a plurality of dynamic-seals positioned between said torus-like outer raceway said inner raceway;
H. means for affixing said inner raceways to respective said walls.

4. The combination of claim 3 wherein said second base-plate of said first drum is common with said first base-plate of said second drum.

5. The combination of claim 3 wherein a line, its respective wall-aperture, and its respective torus all have substantially the same cross-sectional area.

6. The combination of claim 3 wherein said drums are substantially concentric, and have progressively-smaller diameters.

* * * * *